United States Patent [19]
Chen et al.

[11] Patent Number: 5,537,431
[45] Date of Patent: Jul. 16, 1996

[54] METHOD AND APPARATUS FOR BAR CODE READING AND DECODING

[75] Inventors: Chin-Long Chen, Fishkill; Mu-Yue Hsiao, Poughkeepsie, both of N.Y.

[73] Assignee: International Business Machines Corporation, Armonk, N.Y.

[21] Appl. No.: 260,159

[22] Filed: Jun. 15, 1994

[51] Int. Cl.⁶ .................................................. G06F 11/10
[52] U.S. Cl. .......................... 371/54; 235/470; 235/463; 235/462
[58] Field of Search .............................. 371/54, 53, 37.1, 371/37.7, 37.9, 36, 69.1, 67.1, 25.1; 235/462, 437, 438, 470, 435, 463

[56] References Cited

U.S. PATENT DOCUMENTS

| | | | |
|---|---|---|---|
| 4,656,345 | 4/1987 | Kurimoto | 235/472 |
| 4,687,912 | 8/1987 | Ohta | 235/463 |
| 4,757,206 | 7/1988 | Ohta | 235/462 |
| 4,777,357 | 10/1988 | Harada et al. | 235/463 |
| 4,833,306 | 5/1989 | Milbrett . | |
| 5,070,504 | 12/1991 | Bossen et al. | 371/54 |
| 5,268,566 | 12/1993 | Wakaumi et al. | 235/493 |
| 5,324,924 | 6/1994 | Cai et al. | 235/463 |
| 5,420,411 | 5/1995 | Salatto et al. | 235/472 |

*Primary Examiner*—Robert W. Beausoliel, Jr.
*Assistant Examiner*—Phung M. Chung
*Attorney, Agent, or Firm*—Lawrence D. Cutter

[57] ABSTRACT

A method and apparatus reliably and robustly decode single width bar codes that may be placed on a variety of materials. The decoding is independent of whether or not the bar code represents dark bars on a light background or light bars on a dark background. The decoder may be implemented either in hardware or as part of a program in a stored program general purpose computer. The signal processing approach taken generates gap sequence information from width sequence information to match predetermined gap sequence patterns. The method and apparatus of the present invention are also particularly amenable to independent creation of the gap sequences from three different techniques which are independent and which thus add robustness to the system. Lastly, the decoding method of the present invention takes advantage of a preprocessing function to remove any certain forms of noise that may be present in the scanned data.

9 Claims, 8 Drawing Sheets

FIG.4A  ⎤
⎥ CASE I
FIG.4B  ⎦

FIG.4C  ⎤
⎥ CASE II
FIG.4D  ⎦

METHOD AND APPARATUS FOR BAR CODE READING AND DECODING

BACKGROUND OF THE INVENTION

The present invention is generally directed to methods and devices for reading and decoding single width bar codes. More particularly, the present invention is particularly directed to the decoding of scanned bar code patterns which may be presented either as dark bars on a light background or as light bars on a dark background. The present invention also includes a preprocessor for removing "glitches" that may be present as a result of the scanning operation. Additionally, the present method and apparatus is particularly amenable to incorporation of check digit symbols, redundancy and repeated measurements all of which contribute to the overall robustness of the decoding.

The utilization of bar codes has become a very convenient phenomena. Many people are already familiar with the universal product code (UPC) typically employed at supermarket checkout counters not only for purposes of speeding data entry but also for inventory control and the creation of detailed receipts. This is but one example of the utility found in bar code marking systems. The UPC code is however a multi-width bar code and therefore, as a result, reading and decoding operations are more complicated than necessary.

Typically, a bar code pattern is provided on a product by marking with dark bars on a white background. This background may be provided as part of a separate adhesive label or the bar code may be printed as part of the packaging of the box containing various forms of merchandise. However, in certain circumstances it is desirable to provide bar code markings directly on materials like glass, aluminum, plastic, silicon and the like. This is particularly important in those cases when the object being marked will be subjected to process steps which would be inimical to such things as paper labels. In these instances, bar code patterns may be present in the form of light bars on a relatively dark background. Accordingly, it is therefore seen to be desirable to have a mechanism for reading bar code patterns having either of these formats, that is, independently of the nature of the relationship between the background and the foreground in terms of lightness and darkness. It would be desirable to have this operation performed automatically and certainly have it performed in a manner in which the recognition rate is extremely high. It would also be desirable to achieve these goals without the utilization of expensive equipment.

The desirability of reading black on white bar codes and white on black bar codes is evidenced in U.S. Pat. No. 4,656,345, issued Apr. 7, 1987 to Yukuo Kurimoto which is assigned to Tokyo Electric Co., Ltd. and which was filed in the U.S. on Sep. 11, 1985. However, the bar code reader described therein depends upon the manual intervention of the user to operate a switch which in one position inverts the output from a wave shaping circuit. Such a mechanism is naturally disadvantageous in that it requires prior knowledge of the nature of the bar code in order for the system to function. Applicants' invention overcomes this and other problems.

SUMMARY OF THE INVENTION

In accordance with a preferred embodiment of the present invention, a method for decoding a bar code pattern comprises a plurality of steps. First, the bar code pattern is scanned to produce an output waveform which is representative of the variations in relative reflectivity occurring along the scan direction. This waveform is then converted into a sequence of binary signals which are representative of the widths of the bars and spaces within the scanned bar code pattern. Accordingly, this signal sequence contains alternating indicia of bar and space widths. Next, this signal of binary sequences representing bar and space widths, is converted into a signal sequence of indicia indicative of gap size. This gap sequence is then compared with predetermined gap sequence patterns to determine which symbol is represented by the bar code pattern.

In preferred embodiments of the present invention, a preprocessor is employed to treat the electrical waveform signal so as to remove unwanted spikes and also to fill in erroneous data dropouts. A method of carrying out this preprocessing is also described herein.

The present invention also preferably employs a signal range finder mechanism which serves to isolate the beginning and the end of the bar code sequence. It is this second preprocessing mechanism which provides the desired degree of foreground/background independence described above. The signal processing operations described herein as part of the present invention may be implemented either in the form of dedicated hardware structures or instead may be implemented through the utilization of a computer having stored therein programming capable of carrying out the signal processing requirements of the present invention.

Accordingly, it is an object of the present invention to improve the signal processing capabilities associated with the scanning and reading of bar codes.

It is also an object of the present invention to provide signal processing systems which are automatically capable of reading bar codes having dark bars on a light background or light bars on a dark background.

It is a still further object of the present invention to provide signal processing capabilities for bar code scanning in which extra bars and dropouts generated from optical and electrical glitches in the scanning process are eliminated.

It is another object of the present invention to provide greater reliability in bar code reading by the utilization of methods which are consistent with rescanning and other bar code redundancies provided for error detection and correction.

It is a still further object of the present invention to provide signal processing capabilities for bar code scanning in which multiple bar to bar spacing measurements are implemented so as to improve scanning reliability.

Lastly, but not limited hereto, it is an object of the present invention to provide methods and apparatus for the scanning and decoding of single width bar code patterns.

DESCRIPTION OF THE FIGURES

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIGS. 1(A–J) are pulse train waveforms representing real data sampled from a bar code scanner;

FIGS. 2(A–J) are views of the signal waveforms shown in FIG. 1 after preprocessing to remove extraneous glitches and to fill in dropout signal portions;

FIGS. 4(A–D) are illustrations of two cases for glitch correction such as that which is more particularly done in the preprocessing carried out in the generation of the waveform in FIG. 2 from the waveform in FIG. 1;

DETAILED DESCRIPTION OF THE INVENTION

Figure 8:
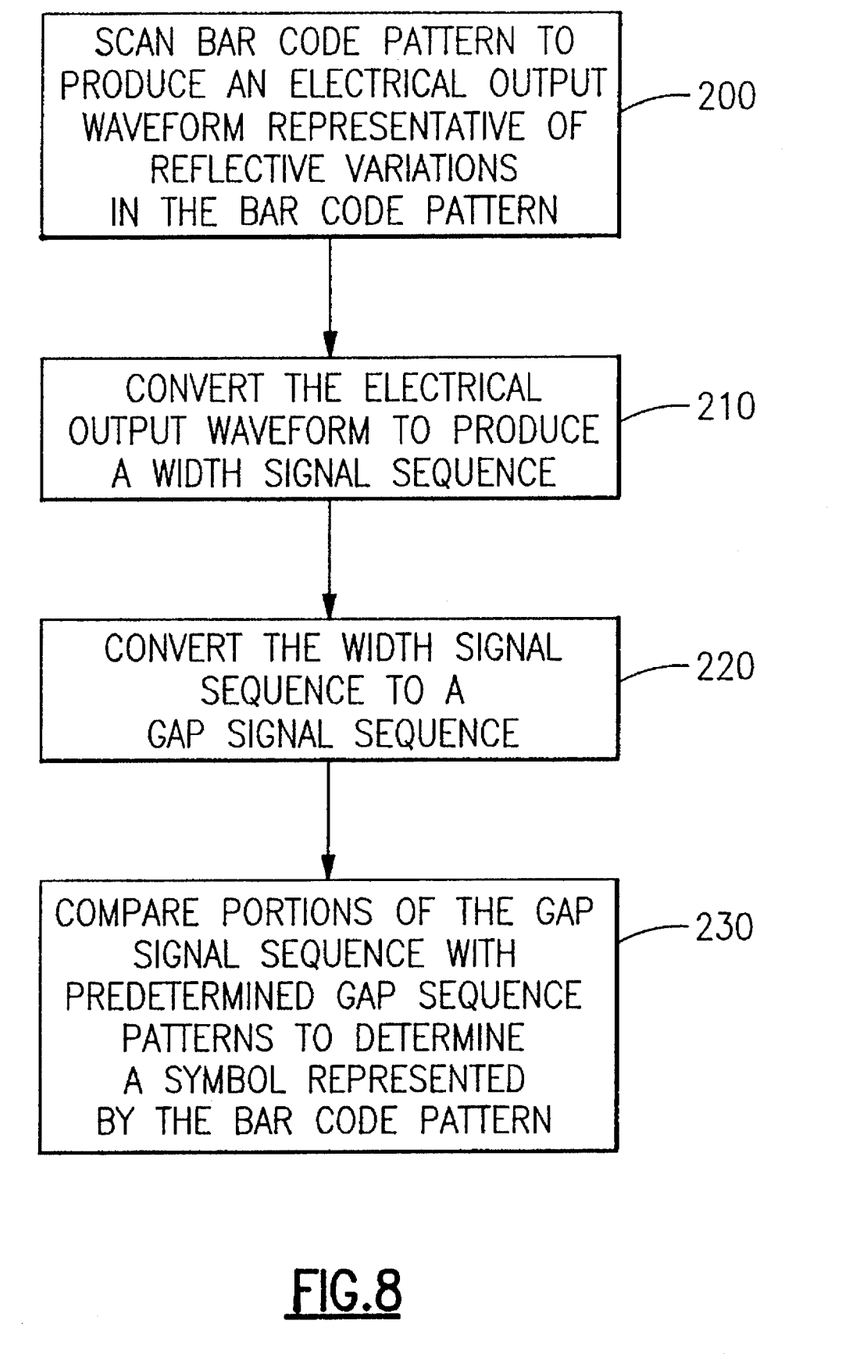
FIG. 8 is a block diagram illustrating the flow of scanning, conversion and comparison operations carried out in accordance with the present invention.

When a bar code is scanned, the typical bar code reader directs a beam of light across the surface on which the bar code is imprinted. By either electrical or mechanical means the beam is made to sweep across the bar code pattern. Because of the different degrees of reflectivity presented during the sweep across the pattern, different voltage level signals are produced at the detector of the bar code reader. A typical one of the waveform patterns that is produced in the detector is shown in FIG. 1. (See step 200 in FIG. 8) However, FIG. 1 is shown herein in broken up form as portions A–J simply because of the length of the scan involved. The scan represents real data. The numbers shown above and below the waveform pattern indicate the duration of that pattern in arbitrary bit units. The reader should not however yet consider this signal waveform as representing either black bar codes on a white background or as a white bar code on a black background. Its nature will be discerned during the signal processing operations described below.

Thus the numbers shown in FIG. 1 do not necessarily represent either bar widths or space widths. This is to be determined. A signal waveform shown such as that shown in FIG. 1 is a function of time which is typically derived from a sequence of signals from a clocked binary counter. Such signals are typically generated by a clocking mechanism which is started and stopped as a result of transitions encountered during the scanning process. (See step 210 in FIG. 8) Accordingly, the numbers shown in FIGS. 1 and 2 represent signal readings which are proportional to the widths of the bars and spaces. It is an important consideration for the present invention for the reader to understand that the raw data shown in FIG. 1 is independent of the relationship between the foreground and the background. In particular, there may be a dark bar placed on a light background or a light bar placed upon a dark background. Either bar code arrangement will be recognizable and processable by the signal processing apparatus of the present invention. Once the incoming scan signal indicative of the bar and space widths is received, it is preferably converted to a numerical signal equivalent and stored in a computer memory system in a table such as that shown in Table I below.

TABLE I

| Width Sequence | | | |
|---|---|---|---|
| ODD | | EVEN | |
| Position | Width | Position | Width |
| 1 | 330 | 2 | 458 |
| 3 | 7 | 4 | 10 |
| 5 | 8 | 6 | 6 |
| 7 | 4 | 8 | 1 |
| 9 | 2 | 10 | 16 |
| 11 | 5 | 12 | 1 |
| 13 | 2 | 14 | 16 |
| 15 | 5 | 16 | 1 |
| 17 | 2 | 18 | 4 |
| 19 | 6 | 20 | 6 |
| 21 | 5 | 22 | 1 |
| 23 | 1 | 24 | 21 |
| 25 | 7 | 26 | 7 |
| 27 | 6 | 28 | 11 |
| 29 | 7 | 30 | 7 |
| 31 | 6 | 32 | 4 |
| 33 | 7 | 34 | 30 |
| 35 | 5 | 36 | 1 |
| 37 | 2 | 38 | 4 |
| 39 | 6 | 40 | 6 |
| 41 | 5 | 42 | 1 |
| 43 | 1 | 44 | 4 |
| 45 | 7 | 46 | 11 |
| 47 | 1 | 48 | 1 |
| 49 | 3 | 50 | 25 |
| 51 | 6 | 52 | 4 |
| 53 | 1 | 54 | 2 |
| 55 | 4 | 56 | 7 |
| 57 | 6 | 58 | 17 |
| 59 | 7 | 60 | 17 |
| 61 | 7 | 62 | 12 |
| 63 | 1 | 64 | 1 |
| 65 | 4 | 66 | 24 |
| 67 | 6 | 68 | 4 |
| 69 | 1 | 70 | 2 |
| 71 | 4 | 72 | 6 |
| 73 | 6 | 74 | 18 |
| 75 | 7 | 76 | 4 |
| 77 | 6 | 78 | 13 |
| 79 | 5 | 80 | 1 |
| 81 | 1 | 82 | 11 |
| 83 | 6 | 84 | 11 |
| 85 | 7 | 86 | 6 |
| 87 | 4 | 88 | 24 |
| 89 | 6 | 90 | 7 |
| 91 | 7 | 92 | 10 |
| 93 | 7 | 94 | 16 |
| 95 | 8 | 96 | 10 |
| 97 | 7 | 98 | 7 |
| 99 | 4 | 100 | 1 |
| 101 | 1 | 102 | 14 |
| 103 | 3 | 104 | 2 |
| 105 | 1 | 106 | 9 |
| 107 | 5 | 108 | 1 |
| 109 | 1 | 110 | 4 |
| 111 | 7 | 112 | 11 |
| 113 | 6 | 114 | 7 |
| 115 | 7 | 116 | 502 |
| 117 | 11 | | |

It is to be noted in Table I above, that it is divided into two portions. Each width measurement is associated with a position in the table. The odd numbered positions are shown in the first column of the table and width measurements associated with even positions are shown in the righthand portions of Table I. This distinction is important for considerations associated with the symbol range finder portion of the present invention which is more particularly described below.

It is noted that, because of drawing space limitations, FIG. 1 was of necessity broken into portions A–J. It is also seen that the numbers shown in FIG. 1 correspond to the width measurements present in Table I. It is these width measurements which provide the raw signal input for signal processing operations carried out in the method and apparatus of the present invention to produce a recognized symbol which is presented by the bar code pattern.

It should be appreciated from FIG. 1 that there are present "glitches" that have occurred during the scanning operation. Two kinds of "glitches" are typically found in the signal pattern from FIG. 1. These are illustrated in FIG. 4. In case I, a portion of a bar or space has been "dropped out" during the scanning operation. In such cases it is desirable to provide a corrective mechanism which fills in the gap. This gap filling is best illustrated by the signal pattern differences shown in FIGS. 4A and 4B.

Figure 4A:
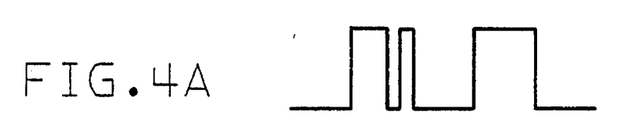
Figure 4B:
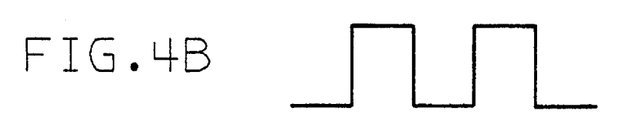
Figure 4C:
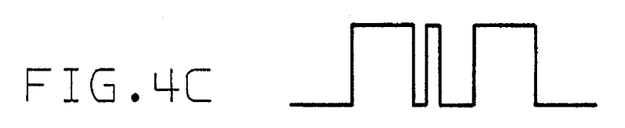
Figure 4D:
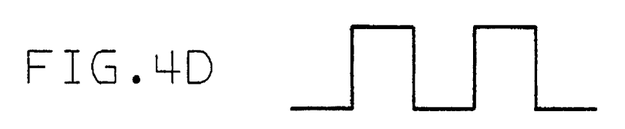

In another form of error, scanning operations produce extraneous glitches. It is possible that a narrow extra bar or space pulse is generated. Such an extraneous pulse is illustrated in FIG. 4C. However, it should be appreciated that it would be very desirable to provide a mechanism for eliminating this extraneous pulse to produce the desired waveform shown in FIG. 4D. This is shown as case II in FIG. 4.

The mechanism for removing these extraneous glitches is provided in a preprocessor portion of Applicants' signal processing method. This process is shown in context as functional block 40 in FIG. 3 and in a more detailed form in FIGS. 5 and 6, which are discussed more fully below. In any event, if the waveform pattern shown in FIG. 1 is processed according to the signal processing method provided by preprocessor 40, the resultant output waveform signal is that which is shown in FIG. 2. However, in preferred implementations of the present invention, it is desirable to provide an internal representation of the sequence of widths encountered in a preprocessed waveform. It is this sequence of widths which contains the information present in the scanned bar code pattern. In accordance with methods of the present invention, the signal represented by the width sequence in Table I above is employed in conjunction with Applicants' preprocessor to effectively produce the signal shown in FIG. 2 whose width sequence is shown in Table II below.

TABLE II

| Processed Width Sequence | | | |
|---|---|---|---|
| ODD | | EVEN | |
| Position | Width | Position | Width |
| 1 | 458 | 2 | 7 |
| 3 | 10 | 4 | 8 |
| 5 | 6 | 6 | 7 |
| 7 | 16 | 8 | 8 |
| 9 | 16 | 10 | 8 |
| 11 | 4 | 12 | 6 |
| 13 | 6 | 14 | 7 |
| 15 | 21 | 16 | 7 |
| 17 | 7 | 18 | 6 |
| 19 | 11 | 20 | 7 |
| 21 | 7 | 22 | 6 |
| 23 | 4 | 24 | 7 |
| 25 | 30 | 26 | 8 |
| 27 | 4 | 28 | 6 |
| 29 | 6 | 30 | 7 |
| 31 | 4 | 32 | 7 |
| 33 | 11 | 34 | 5 |
| 35 | 25 | 36 | 6 |
| 37 | 4 | 38 | 7 |
| 39 | 7 | 40 | 6 |
| 41 | 17 | 42 | 7 |

TABLE II-continued

| Processed Width Sequence | | | |
|---|---|---|---|
| ODD | | EVEN | |
| Position | Width | Position | Width |
| 43 | 17 | 44 | 7 |
| 45 | 12 | 46 | 6 |
| 47 | 24 | 48 | 6 |
| 49 | 4 | 50 | 7 |
| 51 | 6 | 52 | 6 |
| 53 | 18 | 54 | 7 |
| 55 | 4 | 56 | 6 |
| 57 | 13 | 58 | 7 |
| 59 | 11 | 60 | 6 |
| 61 | 11 | 62 | 7 |
| 63 | 6 | 64 | 4 |
| 65 | 24 | 66 | 6 |
| 67 | 7 | 68 | 7 |
| 69 | 10 | 70 | 7 |
| 71 | 16 | 72 | 8 |
| 73 | 10 | 74 | 7 |
| 75 | 7 | 76 | 6 |
| 77 | 14 | 78 | 6 |
| 79 | 9 | 80 | 7 |
| 81 | 4 | 82 | 7 |
| 83 | 11 | 84 | 6 |
| 85 | 7 | 86 | 7 |
| 87 | 502 | | |

It is noted above that the preprocessed width sequence in Table II is decidedly shorter than the width sequence provided to preprocessor 40. This is a natural occurrence that arises because of the elimination of extraneous glitch pulses and the filling in of short dropout signal portions.

Figure 1A:
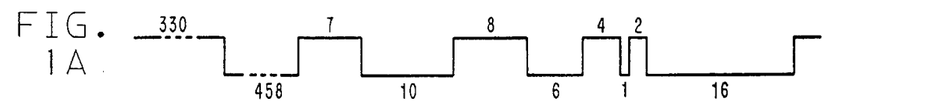
Figure 1B:
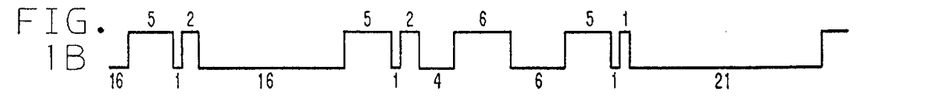
Figure 1C:
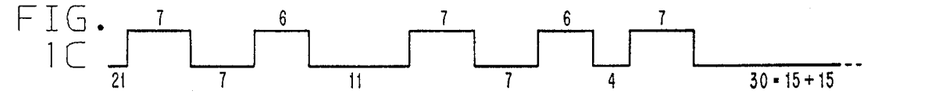
Figure 1D:
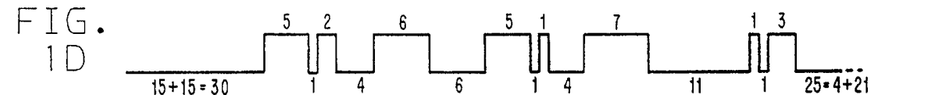
Figure 1E:
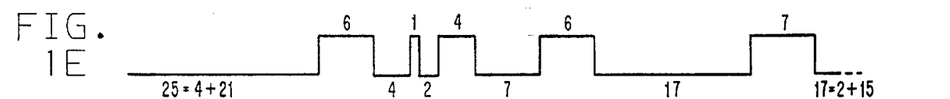
Figure 1F:
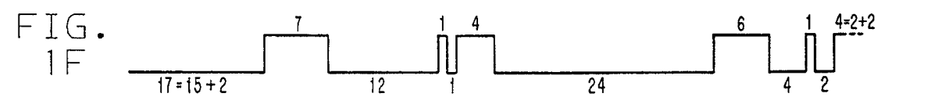
Figure 1G:
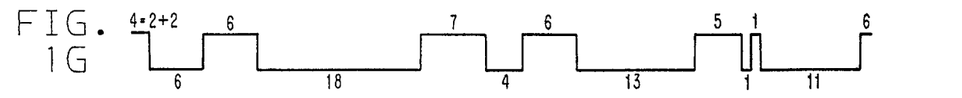
Figure 1H:
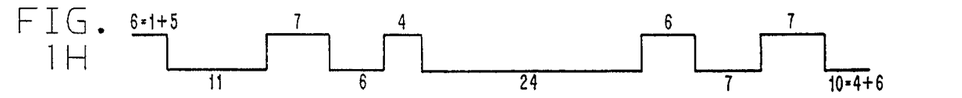
Figure 1I:
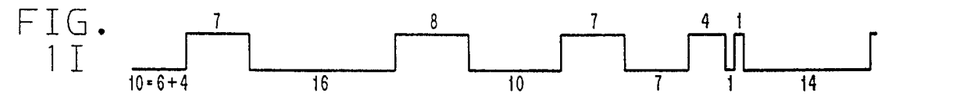
Figure 1J:
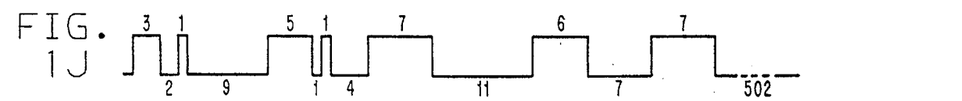
Figure 2A:
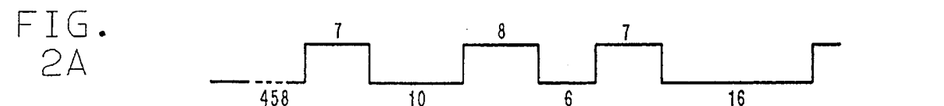
Figure 2B:
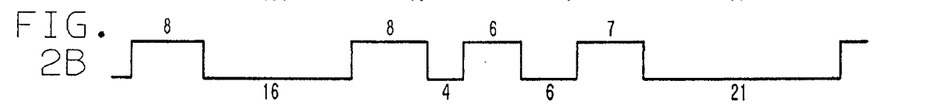
Figure 2C:
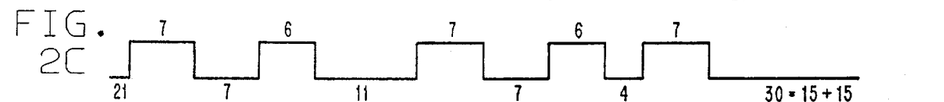
Figure 2D:
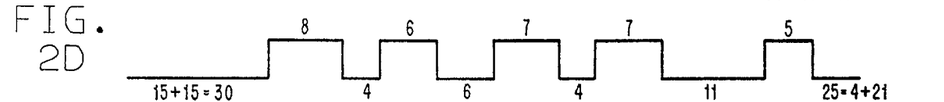
Figure 2E:
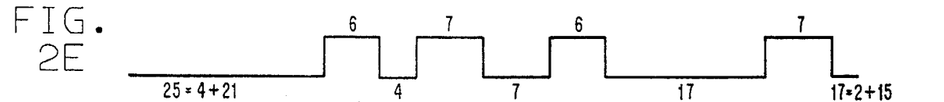
Figure 2F:
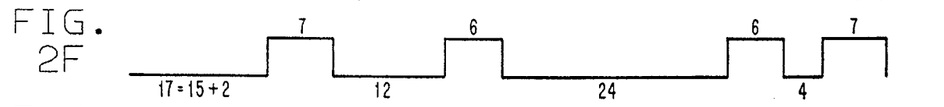
Figure 2G:
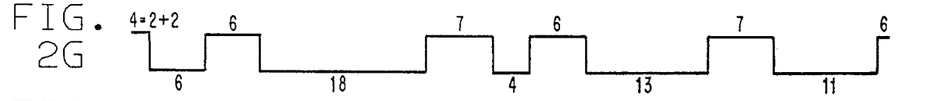
Figure 2H:
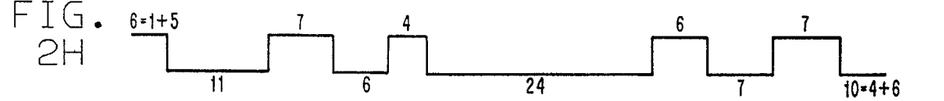
Figure 2I:
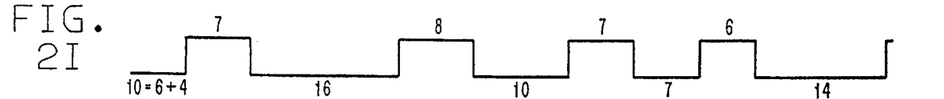
Figure 2J:
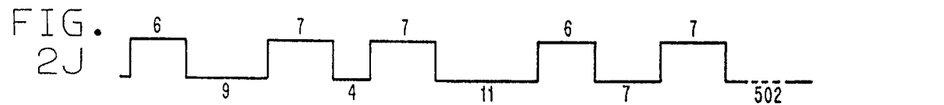
Figure 3:
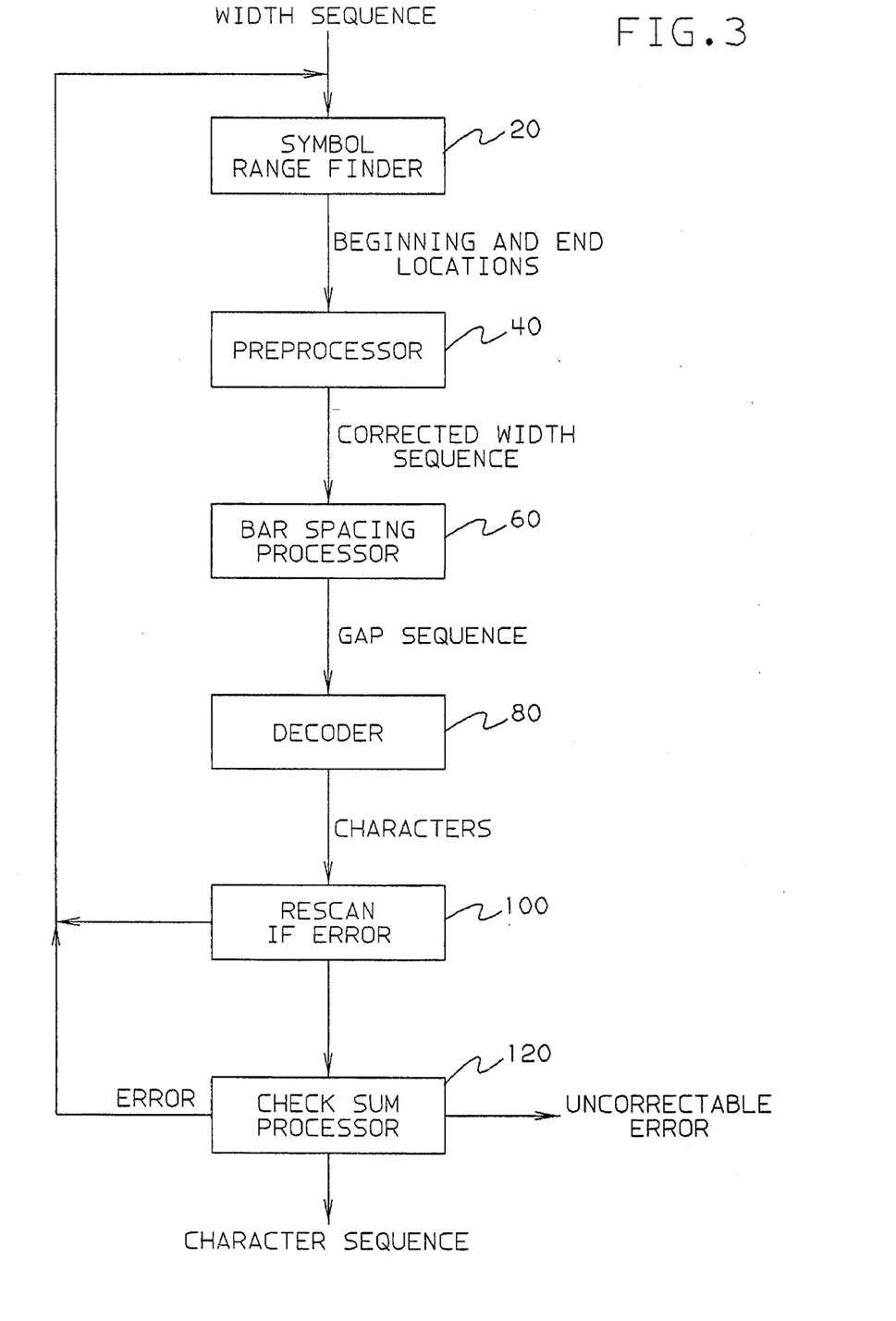
FIG. 3 is a block diagram illustrating the overall signal processing carried out in accordance with a preferred embodiment of the present invention.

The overall signal processing operations carried out in accordance with the present invention are most particularly illustrated in FIG. 3. In particular, it is seen that Applicants' preferred signal processing apparatus is provided with a signal which is represented by the width sequence such as that shown in Table I above. The first step in Applicants' process is the identification of beginning and end locations of bar code symbol patterns. This operation is carried out by symbol range finder 20. The operation of this portion of the invention is described more particularly below.

Once having produced indications of the beginning and end of the bar code pattern using a method which is described below, it should be appreciated that at this point it becomes irrelevant to the rest of the processing that the bar code comprises dark bars on a light background or light bar on a dark background. In particular, it will be seen below that processing by symbol range finder 20 automatically results in the identification of the first bar code bar whether it be light or dark in color with respect to its background.

Once having determined the beginning and end locations of a bar code pattern, preprocessor 40 is employed to remove glitches as partially described above. In particular, the waveform shown in FIG. 2 is typically that which is produced by processor 40 from the input waveform shown in FIG. 1. It is noted however that in Applicants' preferred embodiments of the present invention, the waveform pattern in FIG. 2 is represented internally by digital counter pattern such as those shown in Table II.

Accordingly, the output of preprocessor 40 is a corrected width sequence such as that shown in Table II. At this point the present invention employs bar spacing processor 60 to produce a gap sequence. (see step 220 in FIG. 8) This gap sequence is provided to decoder 80 which compares the resultant gap sequence with characters from predetermined stored character set representations. In particular, the gap sequence translation association shown in Table III illustrates the BC412 bar code which is described in U.S. Pat. No. 5,070,504 and is shown in the table below.

TABLE III

BC412 Character Set

| Character | Gap Sequence | Character | Gap Sequence |
|---|---|---|---|
| 0 | (2, 2, 2, 6) | I | (3, 2, 5, 2) |
| 1 | (2, 2, 3, 5) | J | (3, 3, 2, 4) |
| 2 | (2, 2, 4, 4) | K | (3, 3, 3, 3) |
| 3 | (2, 2, 5, 3) | L | (3, 3, 4, 2) |
| 4 | (2, 2, 6, 2) | M | (3, 4, 2, 3) |
| 5 | (2, 3, 2, 5) | N | (3, 4, 3, 2) |
| 6 | (2, 3, 3, 4) | P | (3, 5, 2, 2) |
| 7 | (2, 3, 4, 3) | Q | (4, 2, 2, 4) |
| 8 | (2, 3, 5, 2) | R | (4, 2, 3, 3) |
| 9 | (2, 4, 2, 4) | S | (4, 2, 4, 2) |
| A | (2, 4, 3, 3) | T | (4, 3, 2, 3) |
| B | (2, 4, 4, 2) | U | (4, 3, 3, 2) |
| C | (2, 5, 2, 3) | V | (4, 4, 2, 2) |
| D | (2, 5, 3, 2) | W | (5, 2, 2, 3) |
| E | (2, 6, 2, 2) | X | (5, 2, 3, 2) |
| F | (3, 2, 2, 5) | Y | (5, 3, 2, 2) |
| G | (3, 2, 3, 4) | Z | (6, 2, 2, 2) |
| H | (3, 2, 4, 3) | START | (3) |
|   |   | STOP | (2) |

It will be noted from the above that the BC412 character set is based upon a single width bar code pattern in which each bar code symbol employs twelve modules four of which contain a bar. It is further noted that this particular code may also employ start and stop characters as shown. It is also to be noted that the gap sequence structure in this particular code lends itself well to comparisons based upon tree structures. For example, if it is determined that the first gap is two units wide, then it is seen that it is only necessary to search through characters 0 through E.

It is also seen that bar spacing processor 60 receives coded width sequences and produces as a result thereof coded waveform gap sequences. It is these gap sequences which are provided to decoder 80 for comparison with bar code character set information such as that shown in Table III.

Also, as more fully discussed below, the gap sequence may be produced in accordance with one of three methods. In a first method, gap sequence is determined using a center-to-center bar approach. In a second method, gap sequence information is derived from leading edge information and, in a third alternate embodiment, the gap sequence is derived from trailing edge measurements. It is to be particularly noted that these three different approaches to gap sequence generation may be employed independently of one another or may be employed in conjunction with one another to provide increased decoding reliability. In particular, one of the aspects of the present process for bar code scanning and decoding is that the gap sequence generated by any of the three above described measurement methods is capable of standing on its own as a means for symbol detection. In contrast, in approaches employed for recognizing multi-width bar codes such as the so called universal product code (UPC) it is necessary to pair together rising edge gap and trailing edge gap measurements to uniquely decode the data into characters. Instead, in the present invention, the different measurements made are employable independently of one another and as such, can be used to make the process either faster or more reliable. In particular, in the present invention reliability is enhanced by processing all three forms of gap measurements.

In particular, one of the primary advantages provided by the present invention is its usability in conjunction with various mechanisms for enhancing the reliability and robustness of the decoding operation. In particular, if the gap sequence provided to decoder 80 does not result in a recognizable gap sequence, it is possible to rescan the entire bar code pattern. This decision is made in functional block 100 shown in FIG. 3. Additionally, at the end of the scan, particularly, when all characters have been matched with an entry in the gap sequence table, it is possible to employ a check sum processor such as that shown in U.S. Pat. No. 5,070,504. Of course, this assumes that bar code was initially written with a check symbol. If so, error detection and single error correction operations may be performed as described in the aforementioned patent. This operation is carried out in functional block 120 shown in FIG. 3. Again, if an error is still found to persist, it is possible to either issue an uncorrectable error signal or to automatically rescan the bar code pattern. It is noted that while these added operations of rescanning and check sum processing are preferable in certain applications of the present invention, they are not required elements of the present process or apparatus.

Having provided an outline of the processes carried out in preferred embodiments of the present invention in FIG. 3, it is now appropriate to consider specific process steps carried out by the various functional blocks shown.

Symbol range finder 20 of the present invention operates in the following manner to determine the beginning and end positions of the bar code symbol in the input width sequence. In particular, this method does not assume a fixed correspondence between ones or zeros and the bar marks. Because of this, the present invention is able to decode dark bar marks on light backgrounds and light bar marks on dark backgrounds. Symbol range finder 20 determines the range of the bar code pattern without specific association of bar-one or bar-zero correspondence.

The symbol range finder works as follows: let $S_o$ be the sum of the width component values at odd positions of the width sequence. Using the data from Table I as the basis for this example, $S_o=610$. Let N be the total number of components of the width sequence. From Table I it is seen that N=117 for this example. Then $A_o$ is defined as being $S_o/N$. This is the average length for the odd components averaged over the total number of components present (even components included).

The present method employs a parameter $M_o$. Typically, this parameter is set between 2.0 and 4.0, dependent upon the width of the quiet zone at the beginning and end of the scan. Generally, $M_o$ is set to smaller values for wider quiet zones. In the present example, it is assumed that $M_o=3.5$. From $A_o$ and $M_o$ the value $H_o=M_oA_o$ is computed. For this particular case, $H_o=18.2$.

Then the table of width values is scanned to find the largest interval in the odd positions in the width sequence such that all of the component widths in this interval have values less than $H_o$, excepting at the ends thereof. $R_1$ and $R_2$ are designated as the beginning and end positions of this interval. For the present example, with $H_o=18.2$ as above, $R_1=1$ and $R_2=117$.

Next, let $S_e$ be the sum of the width component values at even positions between $R_1+1$ and $R_2-1$ in the width sequence from Table I. Let $N_e$ be the number of width components in the range between $R_1+1$ and $R_2-2$. Let $A_e$ be defined as $S_e/N_e$, the "average even length". In the present example, since $S_e=1438$ and $N_e=58$, $A_e=S_e/N_e=24.8$. For the even portion of the process, there is also defined a parameter $M_e$ which provides an additional error control factor. For the BC412 code illustrated herein, $M_e$ preferably lies between 2.0 and 4.0. In the present example, $M_e$ was preferably selected as being 2.5. Accordingly, the corresponding value $H_e$ is computed as $M_e A_e$. For the present example, $H_e=62$. Again, the largest interval in the width sequence between positions $R_1+1$ and $R_2-1$ is found such that these components have values less than $H_e$, except at the ends. This interval is detected and its beginning position is denoted as $R_3$ and its end position is denoted as $R_4$. The next task is thus to define actual values for the beginning and end of the symbol pattern. These values are referred to herein as $R_b$ for the beginning or initial value and $R_e$ for the ending or final value.

In particular, if $R_1$ is greater than $R_3$, $R_b$ is set equal to $R_1$. Otherwise $R_b$ is set equal to $R_3$. If $R_b$ is set to $R_1$, then set $R_e=R_2$ if $R_2$ is less than $R_4$ but set $R_e=R_4-1$ if $R_2$ is greater than or equal to $R_4$. Similarly, if $R_b$ has been set equal to $R_3$ then set $R_e=R_4$ if $R_4$ is less than $R_2$ but if $R_4$ is greater than or equal to $R_2$, then $R_e$ is set equal to $R_2-1$.

The two value values $R_b$ and $R_e$ determine the range of the bar code symbol. The first bar position is at $R_b+1$; and the last bar position is at $R_e-1$. For the data presented in Table I, $R_1$ is 1, $R_2$ is 117, $R_3$ is 2, $R_4$ is 116, $R_b$ is 2 and $R_e$ is 115. The first bar of the code symbols is located at position $R_b+1$ which in this case is 3 and the last bar position is located at $R_e-1$, which in this case is 114. It is thus in this fashion that the beginning and end of the bar code pattern is discerned irrespective of its relative foreground and background darkness or coloration.

Figure 5:
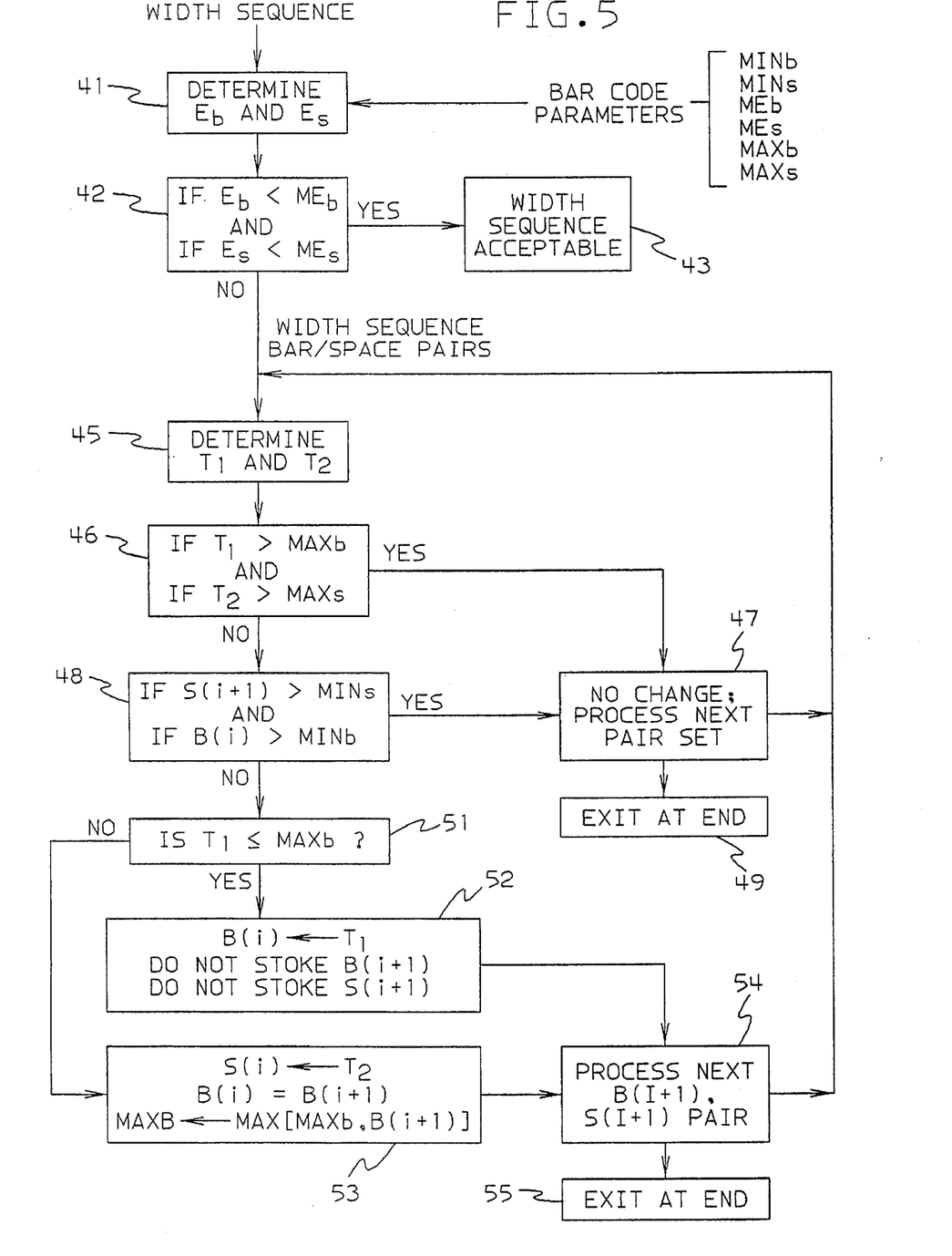
FIG. 5 is a block diagram illustrating the signal processing steps carried out to provide a clean width sequence signal.

Attention is next directed to FIG. 5 which illustrates the signal processing functions which are carried out in preprocessor 40. This process employs several parameters. The value Minb is defined as being the minimum bar width. For the waveform collected from the bar code pattern shown in Table I, Minb=1.2. Mins is the minimum space width. For the present example, Mins is equal to 3. MEb is defined as being the maximum number of allowable narrow bars. For the present example, MEb is 3. Likewise, MEs is the maximum allowable number of narrow spaces. In the present example, this parameter is also 3. Likewise, Maxb is defined as being the maximum bar width and Maxs is defined as being the maximum space width. In this example, Maxb is 8 and Maxs is 30.

Let Eb be the number of bars that are narrower than Minb; and let Es be the number of spaces that are narrower than Mins.

If Eb is less than MEb and Es is less than MEs, no modification of the width sequence is necessary (steps 42 and 43 in FIG. 5).

Figure 6:
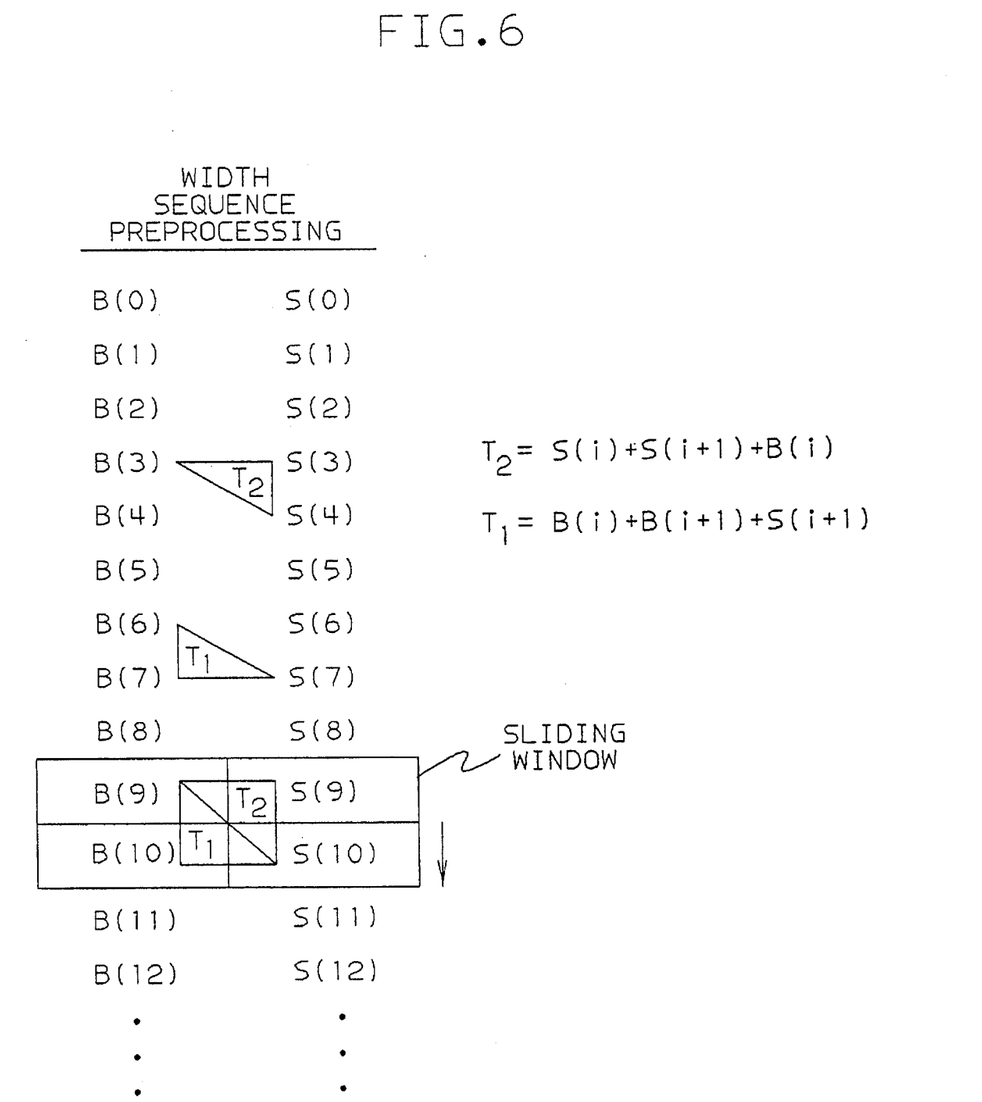
FIG. 6 is a diagram more particularly illustrating a sliding window approach to glitch correction which is more particularly shown in FIG. 5.

The width sequence is processed sequentially by taking two components, a space and a bar or a bar and a space at a time, to form a new width sequence. The width sequence preprocessing is more particularly shown in FIG. 6 where a sliding window is seen to encompass the sequence pairs which are considered at any given time. Additionally, FIG. 6 shows the presence of two triangles $T_1$ and $T_2$ representing two distinct summations which are carried out at each positioning of the sliding window. The sliding window is a construct employed herein only as an aid in understanding the process. It is noted that the vertical placement of the sliding window and the two triangles is thus employed only for illustrative purposes. In general, at any one point in the sequential processing of the width sequence, the sliding window and the two triangles occupy the same position. The triangles are shown separated here only for clarity of illustration. In particular, it is seen that triangle $T_2$ represents the sum $T_2=S(i)+S(i+1)+B(i)$. In a similar fashion, the value $T_1$ is defined as $B(i)+B(i+1)+S(i+1)$. The value $S(i)$ represents the space width of the i-th bar-space pair; $B(i)$ is the corresponding bar width. For each position of the sliding window the values for $T_1$ and $T_2$ are computed (step 45).

If $T_1$ is greater than Maxb and $T_2$ is greater than Maxs, or if $S(i+1)$ is greater than Mins and $B(i)$ is greater than Minb, no change is made to the previous space and bar values. In this case, $S(i+1)$ and $B(i+1)$ are stored and the next pair is processed. This is visualized simply by moving the sliding window down one row.

If $T_1$ is not greater than Maxb, the previous bar width $B(i)$ is set equal to $T_1$. In this case, the values $S(i+1)$ and $B(i+1)$ are not stored, or alternatively are deleted from the list. Next, the next pair of entries is processed (see FIG. 5, step 52).

Next set $S(i)$ to $T_2$ and set $B(i)$ to $B(i+1)$. Maxb is set equal to the larger of the previous value of Maxb and $B(i+1)$. Again, $S(i+1)$ and $B(i+1)$ are not stored. Processing continues on therefore with the next pair of values from Table I. In this fashion, Table II as illustrated above is created. It is seen from comparing FIGS. 1 and 2 that it is desirable to provide a preprocessing stage where signal glitches (extra pulses and dropouts) are removed in the manner described above and as shown in flowchart form in FIG. 5. In those circumstances where scanning inaccuracies are at a minimum, it is possible to eliminate the preprocessing step carried out in FIG. 5 while still achieving other desirable benefits related to bar code pattern recognition.

Figure 7:
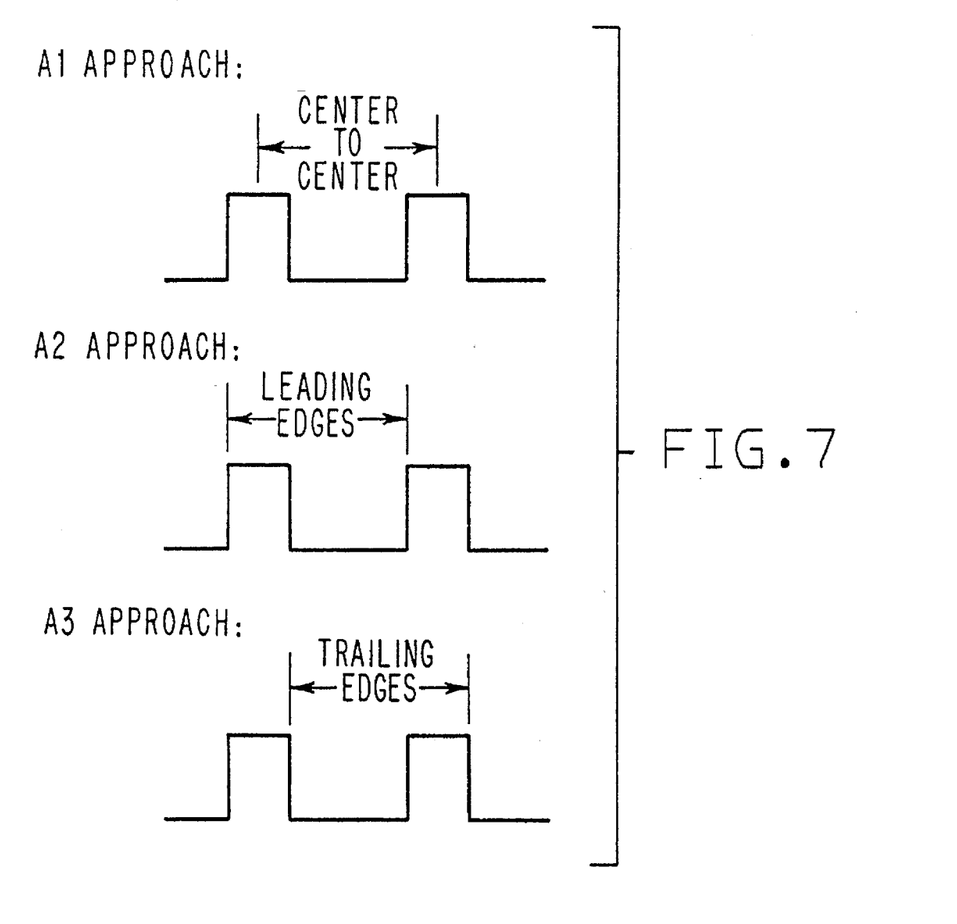
FIG. 7 is an illustration of the three methods that may be employed in preferred embodiments of the present invention to generate desired gap sequences which are ultimately used to provide symbol and/or character recognition indications.

Next is considered the operation of bar spacing processor 60 in FIG. 3. This function receives a corrected width sequence such as that shown in Table II above and produces an output gap sequence such as might be obtained by concatenating the elements shown above and produces an output gap sequence such as might be obtained by concatenating the elements shown in Table III. In particular, it is noted that the gap sequences (as opposed to the width sequences) may be produced from any one of three approaches. These approaches are illustrated in FIG. 7. Approach A1 is designated herein as the approach in which center-to-center bar gaps are measured. Approach A2 designates the approach in which gaps are measured from the leading edge of one bar to the leading edge of the next bar. Lastly, approach A3 denotes that method used herein in which gap distances are measured from the trailing edge of a first bar to the trailing edge of the next bar. For an overview of the process see FIG. 8.

For example, suppose that $WS=(w1, w2, \ldots, w_n)$ be the processed width sequence ready for decoding. Accordingly, bar spacing processor 60 produces a gap sequence $GS=(g_1, g_2, g_3, \ldots)$. Thus GS is the translated gap sequence which is output from processor 60. The values $g_i$ may be computed in accordance with any one of the three approaches shown in FIG. 7. For the center-to-center approach, A1, it is seen that $g_i=0.5(w_{2i}+w_{2i+2})+w_{2i+1}$. In the leading-edge to leading-edge approach, A2, the values $g_i$ are determined by $g_i=w_{2i}+w_{2i+1}$. Lastly, in the trailing edge to trailing edge approach, A3, the values are computed as $g_i=w_{2i+1}+w_{2i+2}$. If the above approaches are applied to the width sequence shown in Table II the resulting gap sequences are those which are shown in Table IV below.

TABLE IV

| Distances Between Bars (GS = ($g_1$, $g_2$, . . .)) | | |
|---|---|---|
| A1 | A2 | A3 |
| 17.5 | 17.0 | 18.0 |
| 13.5 | 14.0 | 13.0 |
| 23.5 | 23.0 | 24.0 |
| 24.0 | 24.0 | 24.0 |

TABLE IV-continued

| Distances Between Bars (GS = ($g_1, g_2, \ldots$)) | | |
|---|---|---|
| A1 | A2 | A3 |
| 11.0 | 12.0 | 10.0 |
| 12.5 | 12.0 | 13.0 |
| 28.0 | 28.0 | 28.0 |
| 13.5 | 14.0 | 13.0 |
| 17.5 | 17.0 | 18.0 |
| 13.5 | 14.0 | 13.0 |
| 10.5 | 10.0 | 11.0 |
| 37.5 | 37.0 | 38.0 |
| 11.0 | 12.0 | 10.0 |
| 12.5 | 12.0 | 13.0 |
| 11.0 | 11.0 | 11.0 |
| 17.0 | 18.0 | 16.0 |
| 30.5 | 30.0 | 31.0 |
| 10.5 | 10.0 | 11.0 |
| 13.5 | 14.0 | 13.0 |
| 23.5 | 23.0 | 24.0 |
| 24.0 | 24.0 | 24.0 |
| 18.5 | 19.0 | 18.0 |
| 30.0 | 30.0 | 30.0 |
| 10.5 | 10.0 | 11.0 |
| 12.5 | 13.0 | 12.0 |
| 24.5 | 24.0 | 25.0 |
| 10.5 | 11.0 | 10.0 |
| 19.5 | 19.0 | 20.0 |
| 17.5 | 18.0 | 17.0 |
| 17.5 | 17.0 | 18.0 |
| 11.5 | 13.0 | 10.0 |
| 29.0 | 28.0 | 30.0 |
| 13.5 | 13.0 | 14.0 |
| 17.0 | 17.0 | 17.0 |
| 23.5 | 23.0 | 24.0 |
| 17.5 | 18.0 | 17.0 |
| 13.5 | 14.0 | 13.0 |
| 20.0 | 20.0 | 20.0 |
| 15.5 | 15.0 | 16.0 |
| 11.0 | 11.0 | 11.0 |
| 17.5 | 18.0 | 17.0 |
| 13.5 | 13.0 | 14.0 |

It is noted above in Table IV that there are three columns which are derived from the three different approaches to gap sequence generation. The first column describes the center-to-center bar measurement approach; the middle column denotes the leading edge to leading edge measurement approach result; and lastly the third column denotes the gap sequence measurements that result when one looks to the trailing edges of the bars to determine gap sequences.

It is noted that in the present invention any one or all three or a weighted average of all three of these results may be employed as a mechanism for producing the ultimate quadruples of gap sequences such as is shown in Table III. It is of course from this Table that the proper decoding and recognition comparison operation is made.

However, before utilizing this Table, it is desirable to produce an auxiliary sequence of values from the gap sequence of values $g_i$. In particular, let $G=g_2+g_3+g_4+g_5$. Let $H=(h_1, h_2, h_3, h_4, h_5)$. The values of $h_i$ are defined as $h_i=12 (g_i/G)$. The $h_i$ numbers are rounded to the nearest integer. When this is done, the resultant sequence H should define an encoded bar code symbol.

If the above operations for computing the auxiliary sequence H are carried out in accordance with the numbers in the present example using the center-to-center approach, the following results occur: $G=13.5+23.5+24+11=72$; $h_1=12 (g_1/G)=12(17.5)/72=3$ (to the nearest integer); $h_2=12(13.5)/72=2$; $h_3=12(23.5)/72=4$; $h_4=12(24)/72=4$; and $h_5=12(11)/72=2$ (all these results being given to the nearest integer).

It is to be noted that in the present case that the first five results in the auxiliary sequence H are three, two, four, four and two corresponding to a start character of "3" and a sequence (2, 4, 4, 2) corresponding to the letter B. When a match for H is found in the patterns of Table III, the corresponding character is decoded and the corresponding four components of the gap sequence are deleted and the process continues with the next four components (See step 230 in FIG. 8). Otherwise the decoding fails. Upon recognition though processing continues with the next 4 values of $g_i$.

From the above, several important aspects of the present invention are apparent. The first is the methodology of processing and decoding binary output data from a bar code scanner in substantially three steps as shown in FIG. 3. These steps include the symbol range finding operation (functional block 20), preprocessing to remove glitches (functional block 40) and a gap sequence generation (functional block 60). It is further seen that the present invention employs the representation of binary data in the form of a width sequence. It is furthermore seen that the present invention provides a method for finding the range of width sequences that actually represent the bar code pattern. This provides a method for determining the start and starting space for the bar code pattern. It is also noted that the present invention provides relatively flexible parameters which may be employed to improve the decoding process. It is also seen that the present invention provides three independent mechanisms for the generation of the gap sequence. These generation methods depend upon where one starts to measure the beginning of a gap and the end of the next gap. It may be from center to center, leading edge to leading edge or trailing edge to trailing edge. It is a unique aspect of the present invention that these measurements may be employed independently to arrive at a recognized character. Other methods must employ these approaches in pairs. As such other methods suffer from reduced ability to provide redundancy in signal processing and pattern recognition. It is further noted that the present invention fulfills all of the objectives cited above.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for decoding a bar code pattern, said method comprising the steps of:

scanning said bar code pattern to produce an electrical output waveform representation of reflective variations occurring during said scanning;

converting said electrical output waveform to a sequence of binary signals representative of bar and space widths in said bar code pattern so as to produce a width signal sequence representing, in alternating fashion, the bar and space widths present in said bar code pattern;

converting said width signal sequence to a gap signal sequence; and     comparing portions of said gap signal sequence with predetermined gap sequence patterns to determine a symbol represented by said bar code pattern.

2. The method of claim 1 further including the step of adjusting said width signal sequence to remove extraneous signal spikes or signal dropouts, said adjusting being performed just after said step of converting said electrical output waveform.

3. The method of claim 1 further including the step of determining from said bar and space widths and from bar and space positions, as specified by said width signal sequence, beginning and end positions of the bar code pattern so as to eliminate from said width signal sequence all signal portions lying outside said beginning and end positions.

4. The method of claim 1 in which said gap signal converting is based on at least one of the following steps:
   a.) determining said gap signal sequence based on center-to-center width sequence values;
   b.) determining said gap signal sequence based on leading edge-to-leading edge sequence values; and
   c.) determining said gap signal sequence based on trailing edge-to-trailing edge sequence values.

5. A method for decoding a bar code pattern having a check sum symbol, said method comprising the steps of:
   a.) 1. scanning said bar code pattern to produce an electrical output waveform representative of reflective variations occurring during said scanning;
   2. converting said electrical output waveform to a sequence of binary signals representative of bar and space widths in said bar code pattern so as to produce a width signal sequence representing, in an alternating fashion, bar and space widths present in said bar code pattern;
   3. converting said width signal sequence to a gap signal sequence;
   4. comparing said gap signal sequence with predetermined gap sequence patterns to produce a symbol sequence including said check sum symbol;
   b.) determining if said check sum symbol is correct and repeating steps a.) 1 through a.) 4 for a specified number of times if said check sum symbol is incorrect; and
   c.) indicating a decoded symbol pattern or that an uncorrectable error has occurred.

6. A method for decoding a bar code pattern, said method comprising the steps of:
   a.) 1. scanning said bar code pattern to produce an electrical output waveform representative of reflective variations occurring during said scanning;
   2. converting said electrical output waveform to a sequence of binary signals representative of bar and space widths in said bar code pattern so as to produce a width signal sequence representing, in an alternating fashion, bar and space widths present in said bar code pattern;
   3. converting said width signal sequence to a gap signal sequence; and
   4. comparing said gap signal sequence with predetermined gap sequence patterns to produce a symbol sequence;
   b.) repeating steps a.) 1 through a.) 2 for a specified number of times; and
   c.) indicating a decoded symbol pattern or that an uncorrectable error has occurred based on the results from said repeated steps a.) 1 through a.) 4.

7. The method of claim 6 in which the indicated decoded symbol pattern is that pattern that is detected in a majority of said repetitions.

8. A method for decoding a bar code pattern, said method comprising the steps of:
   a.) 1. scanning said bar code pattern to produce an electrical output waveform representative of reflective variations occurring during said scanning;
   2. converting said electrical output waveform to a sequence of binary signals representative of bar and space widths in said bar code pattern so as to produce a width signal sequence representing, in alternating fashion, the bar and space widths present in said bar code pattern;
   3. converting said width signal sequence to produce a gap signal sequence based upon values selected from the group consisting of center-to-center width sequence values, leading edge-to-leading edge sequence and trailing edge-to-trailing edge sequence values; and
   4. comparing said gap signal sequence with predetermined gap sequence patterns to produce a symbol sequence; and
   b.) repeating the steps a.) 1 through a.) 4 for a specified number of times to produce a plurality of gap signal sequences; and
   c.) indicating a decoded symbol pattern or that an uncorrectable error has occurred based on the results from said repetition.

9. The method of claim 8 in which the indicated decoded symbol pattern is that pattern that is detected in a majority of said repetitions.

* * * * *